United States Patent [19]

Yang et al.

[11] Patent Number: 6,042,754
[45] Date of Patent: *Mar. 28, 2000

[54] CONTINUOUS EXTRUSION-COMPRESSION MOLDING PROCESS FOR MAKING OPTICAL ARTICLES

[75] Inventors: Zhou Yang; Yinghui Wu, both of Milford, Conn.

[73] Assignee: Optima, Inc., Stratford, Conn.

[*] Notice: This patent is subject to a terminal disclaimer.

[21] Appl. No.: 09/182,961

[22] Filed: Oct. 30, 1998

[51] Int. Cl.[7] ........................................ B29D 11/00
[52] U.S. Cl. .......................... 264/1.1; 264/2.2; 264/2.5; 264/297.3; 264/297.6; 425/348 R; 425/411; 425/412; 425/449; 425/808
[58] Field of Search ....................... 425/348 R, 347, 425/411, 412, 447, 449, 808; 264/1.1, 1.36, 2.2, 2.3, 2.5, 297.2, 297.3, 297.6, 297.8

[56] References Cited

U.S. PATENT DOCUMENTS

| | | |
|---|---|---|
| 4,008,031 | 2/1977 | Weber . |
| 4,091,057 | 5/1978 | Weber . |
| 4,254,065 | 3/1981 | Ratkowski . |
| 4,364,878 | 12/1982 | Laliberte et al. . |
| 4,409,169 | 10/1983 | Bartholdsten et al. . |
| 4,442,061 | 4/1984 | Matsuda et al. . |
| 4,519,763 | 5/1985 | Matsuda et al. . |
| 4,540,534 | 9/1985 | Grendol . |
| 4,627,809 | 12/1986 | Okabayashi et al. . |
| 4,707,321 | 11/1987 | Segawa et al. . |
| 4,828,769 | 5/1989 | Maus et al. . |
| 4,836,960 | 6/1989 | Spector et al. ........................ 264/2.2 |
| 4,933,119 | 6/1990 | Weymouth, Jr. ...................... 264/2.2 |
| 5,264,160 | 11/1993 | Arai et al. ............................ 264/1.38 |
| 5,275,637 | 1/1994 | Sato et al. ............................. 264/1.1 |
| 5,679,756 | 10/1997 | Zhu et al. . |
| 5,700,307 | 12/1997 | Kashiwagi et al. . |

FOREIGN PATENT DOCUMENTS

0130769 B1   4/1988   European Pat. Off. .

Primary Examiner—Mathieu D. Vargot
Attorney, Agent, or Firm—DeLio & Peterson LLC

[57] ABSTRACT

The present invention relates to making optical articles such as opthalmic lenses by molding and, in particular, to using a continuous extrusion-compression molding method to make plastic lenses whereby a polymer melt is fed from an extruder or melting apparatus to a first die of a plurality of rotating or conveyed sequentially processed compression die sets comprising a first die and a second die. The die sets are positioned on die supports on a rotating turntable or conveying system, the lenses formed by compressing the die sets with pressing means associated with each die support, the lenses separated from the dies and the dies recycled to die loading and the melt feed step of the process and the process repeated until the desired number of lenses or other optical articles such as compact disk substrates are produced.

30 Claims, 7 Drawing Sheets

FIG. 3A
(Zone 1)

FIG. 3B
(Zone 2)

FIG. 3C
(Zone 3)

FIG. 3D
(Zone 4)
(Zones 5-10)

FIG. 3E
(Zone 11)

FIG. 3F
(Zone 12)

FIG. 5

CONTINUOUS EXTRUSION-COMPRESSION MOLDING PROCESS FOR MAKING OPTICAL ARTICLES

BACKGROUND OF THE INVENTION

1. Field of the Invention

The present invention relates to making optical articles such as opthalmic lenses or substrates for compact disks by molding and, in particular, to using a continuous extrusion-compression molding method to make plastic lenses whereby a polymer melt is fed from an extruder or melting apparatus to a first die of a plurality of rotating sequentially processed compression die sets comprising a first die and a second die positioned on a rotating turntable or conveying system, the lenses formed by compressing the die sets, the lenses separated from the dies and the dies recycled to die loading and the melt feed step of the process and the process repeated until the desired number of lenses are produced.

2. Description of Related Art

Direct compression molding of thermoplastic and thermoset polymers to make plastic optical articles such as lenses has been used for years. Basically, the compression molding process uses a packed powder or a pre-form material and the article is formed by adding the material to a mold, closing the mold and pressing the mold at an elevated temperature. The mold typically consists of a lower die and an upper die forming a mold or die set. In a thermoplastic lens compression molding process, the material and the mold are heated to a predetermined temperature to soften the material and a compressive force applied to the mold for a predetermined time to reach a predetermined cavity size with excess material being squeezed out of the mold. The mold is then cooled and opened and the article removed from the mold. This method, however, is not commercially attractive because it has a long cycle time, poor energy efficiency and it is economically less beneficial compared with an injection molding process. A direct injection molding process, in general, is a faster and more efficient method for molding thermoplastic materials.

In molding such optical articles as a negative powered Rx lense, however, conventional injection molding methods have a number of serious operational problems. These type lenses have a cross section in which the center is thinner than the edge and this feature makes direct injection molding very difficult especially when the viscosity of the melt is high. In general, the melt injected into the mold tends to fill the edge of the mold first due to less resistance in the thicker section of the mold cavity and after filling much of the edge area, the melt redirects itself to the center thinner area of the mold cavity. The mold used in an injection molding process has to be relatively cold due to the need for shortening the cycle time and when the melt meets in the center area a knit line is often formed. This phenomenon is especially serious when molding a lens with thinner center thickness which has higher value due to its lighter weight. In addition, injection molding typically introduces orientation-induced stress and birefringence. Lack of sufficient packing force used in cold runner injection molding technology often results in uneven shrinkage related lens pre-release and causes line marks on the lens surface. These type problems have to be avoided for the article to be suitable for optical uses.

Other type optical articles which can be made using the method and apparatus of the invention include plastic substrates used to make compact disks used in CD-ROMS, CD players, etc. In general, the substrate is a circular planar disk up to about 1.8 mm thick and is made from a plastic such as polycarbonate. As is well known in the art, the plastic disk substrate is plated or coated with recording layers. Conventional injection molding has been found to be very difficult and injection-compression molding is typically used.

To overcome some of the above problems, injection-compression molding technology has been developed as shown in U.S. Pat. Nos. 4,008,031; 4,091,057; 4,254,065; 4,364,878; 4,409,169; 4,442,061; 4,519,763; 4,540,534; 4,627,809; 4,707,321; 4,828,769; and European Patent Publication 0130769, which patents are hereby incorporated by reference. Generally, a shot of melt is injected into a separated mold using an injection molding machine. The mold is then closed to apply a compressive force to the melt and packs the mold cavity by hydraulic clamping or from an auxiliary component such as springs. The timing for the injection and compression steps, melt shot size and temperature control of the mold are all critical operational factors. In many cases, hot runner technology has to be used to gain sufficient packing force.

Even though there are different versions of the injection-compression molding technology, they are more or less similar to each other and this technology has certain drawbacks. For one, the process often produces a product having some stress and birefringence possibly due to the large temperature difference between the mold and the melt. Additionally, the cycle time is often very long because filling of the mold is a slow process and in some improved methods, the mold has to be heated and cooled in every cycle. The use of hot runner technology increases the time the material is exposed to high temperatures and a heat sensitive material may be adversely affected. The cost of the mold is also extremely high and the controlling system to coordinate the injection and compression steps is critical and often very complicated and expensive. Further, in order to make different power lenses, the mold inserts must be changed which causes down time and process inefficiency.

Many polymeric materials are compounded in an extruder by adding to the extruder the polymer in the form of pellets and additives. Some specialized optical materials such as thiourethane and urethane polymers and/or copolymers are made in reaction extruders by adding the polymer reactants to the extruder. When molding an article, the pellets may also be heated in a molding machine and fused into a melt or softened to facilitate the molding process. Typically, however, plastic materials are prone to decomposition at high temperatures and/or in a long heating process. There is also generally a direct relationship between the optical and mechanical properties of polymer lenses and how many times and how long the polymer has been fused, especially for heat sensitive materials. Normally, materials formed into optical articles need to have a thermal history as short as possible, otherwise, increased yellowing, oxidation of the polymer and deteriorated mechanical properties may result. Also from an energy efficiency point of view, re-heating plastic pellets to a molten form is not economically nor environmentally attractive. One of the difficulties of utilizing the melt from an extruder directly as a feeding source to the molding machine is that extrusion is typically a continuous process and the conventional injection molding, injection-compression molding, and compression molding methods are all batch or intermittent processes. To couple a continuous extruder with an intermittent or batch molding machine presents a formidable burden.

In a related application, U.S. Ser. No. 09/014,811 entitled "Extrusion-Compression Molding of Optical Articles" filed Jan. 28, 1998 and assigned to the assignee of the present invention, an extrusion-compression molding method is disclosed which overcomes many of the problems of the prior art.

Bearing in mind the problems and deficiencies of the prior art, it is an object of the present invention to provide a continuous method of molding polymers, particularly thermoplastic materials, into optical articles such as Rx lenses and compact disk substrates using an extruder or other apparatus to form a polymer melt and to compression mold the melt to form optical articles without commercially unacceptable defects such as a knit line and pre-release marks and with minimum stress and birefringence.

It is another object of the present invention to provide a continuous method which is energy efficient and has reduced thermal processing time whereby an extruded melt is used directly from a reaction extrusion or other extrusion process to mold an optical article without the additional steps of making pellets and then fusing the pellets to mold the article.

It is another object of the invention to provide a thermoplastic lens molding method in which there is no down time when changing from making a lens of a certain power to another different power.

In another object of the invention, a continuous method is provided for the use of pelletized thermoplastic materials to make optical articles.

It is a further object of the present invention to provide a continuous method whereby an extruder or a reaction extruder and compression molding of a die set comprising at least two die sections are used in sequence to make optical articles such as lenses.

Another object of the invention is to provide an apparatus for continuously making optical articles such as lenses and substrates for compact disks by a molding process.

In another object of the invention, optical articles continuously made using the method and apparatus of the invention are also provided.

An additional object of the invention is to provide a method for post-treating compression molded die sets containing lenses to form optical articles with minimum stress and birefringence which is significantly less than present lenses in the marketplace.

Still other objects and advantages of the invention will be obvious in part from the specification.

SUMMARY OF THE INVENTION

This invention is directed in one aspect to a continuous extrusion-compression (E-C) molding process which is a sequential series of steps comprising supplying a rotating turntable or conveying means (e.g. conveyor belt) having a plurality of die supports preferably positioned in spaced openings therein, pressing means communicating with the die supports and most preferably with each of the die supports, lower die and upper die loading means communicating with the die supports to form a die set, and ejection means communicating with the die supports; extruding or melting a polymer material to form a melt which melt is formed into an optical article by feeding the melt onto a lower die positioned on a die support, feeding an upper die on top of the melt forming a melt containing die set, compressing the die set using the pressing means, separating the die set from the turntable or conveying means by the ejection means, separating the lower die and upper die from the formed optical article and recycling the lower die and upper die for reuse to form additional optical articles.

The invention in another aspect includes a molding method for molding both heat sensitive thermoplastic optical materials and conventional thermoplastic optical materials. The materials include, but are not limited to, optical thermoplastic thiourethane-urethane copolymers (as described in U.S. Pat. No. 5,679,756), polystyrene, acrylic polymers, polycarbonate, and SAN. As will be appreciated by those skilled in the field, a small amount of crosslinking agent(s) may be used in the extrusion (melt) and the molded article will not be completely re-fusible. The term thermoplastic used herein includes such polymers containing small amounts of cross-linking agents.

In another aspect of the invention a method of forming an optical article is provided comprising:

supplying a rotating turntable having a plurality of spaced die supports for a lower die and an upper die forming an optical article forming die set, preferably in the form of movable die supports in spaced openings in the turntable and preferably positioned at the periphery of the turntable;

rotating the turntable;

forming a melt of an optical polymeric material;

supplying a lower die from a lower die supply device onto one of the die supports in one of the spaced openings;

adding a portion of the melt to the upper surface of the lower die preferably in an amount sufficient to form the desired lens;

supplying an upper die from an upper die supply device and positioning the upper die on top of the melt forming a melt containing die set comprising, in sequence, a lower die, polymeric material and an upper die;

compressing the melt containing die set using a press associated with the die support forming an optical article;

releasing the press when the optical article is formed;

removing the die set from the rotating turntable;

preferably annealing or otherwise post-treating the die set;

removing the optical article from the die set;

recycling the lower die and upper die of the die set to their respective supply devices; and repeating the above steps until the desired number of optical articles are made.

An extruder used in the process can be a twin screw intermeshing, non-intermeshing or combination of twin screw and a single screw extruder or a single screw extruder or any other suitable extruder. The melt formed by the extruder or other melting apparatus is fed to a lower die of a mold die set which lower die is transported in a rotary direction by the rotating turntable of the preferred method and apparatus. The top (upper) die of the die set is then positioned on top of the rotating filled lower die forming a polymer containing die set on the die support which is preferably positioned in an opening in the rotating turntable. The die set is then pressed. The die support is preferably movable along the longitudinal axis of the opening to facilitate lowering the die support for feeding the molds to the apparatus and raising the die support for ejecting the formed optical article containing die sets from the apparatus. The polymer containing die set is pressed using a predetermined pressure preferably 10–2,000 psi. The thickness of the formed optical article is typically determined by a pre-set cavity gap between the upper die and lower die which may be controlled by a spacer positioned between the upper surface of the lower die and the lower surface of the upper die or simply by a precise melt volume deposited in the die set. The die surfaces may be pre-treated with releasing agents as well known in the art.

The individual lower and upper dies of the die set are preferably preheated when the melt is deposited thereon and more preferably to a temperature higher than the Tg of the polymer and lower than the decomposition temperature of the polymer. The temperature of the dies and/or die set is preferably between 20° C. higher than the Tg to 10° C. lower than the decomposition temperature of the polymer. The elevated temperature of the die set used in this method is an important feature of the invention which is to be compared and contrasted with injection molding and injection-compression molding processes where the mold is essentially cold (temperature lower than Tg) when the melt is forced into the mold. It has been found that the higher die set temperature enables the polymer to more effectively copy the surface features of the die and provides commercially acceptable optical articles.

After the die set is pressed to a predetermined die set cavity gap height, the pressed position is held for an effective time to solidify the polymer, e.g. 5–15° sec. while the die set rotates on the turntable. The press is then released and the die set removed from the rotating turntable. The rotating turntable is moving and when the now empty die support reaches the lower die feed step, a new lower die is fed to the mold support in the opening in the turntable and the above process continued.

The die set with the molded part therein is typically post treated, e.g., maintained for an effective time at a temperature about 20° C. lower than Tg to 80° C. higher than the Tg of the material and below the decomposition temperature of the optical article. The die set is preferably closed during post treatment. A number of different post treatments can be performed according to the properties of the material. The die set can be closed and the temperature of the die set maintained by heating to allow annealing of the article to minimize stress and birefringence without deforming the shape of the article. In another option, the temperature can be gradually lowered to a temperature below the Tg, e.g., room temperature, and the die set opened to release the molded article.

In a highly preferred method, the die set is cooled to an initial temperature about 1–20° C., preferably 10–20° C. above Tg. From this initial temperature to about 15° C. or more below Tg, the temperature is reduced at a rate up to about 0.1 to 5° C./min., preferably 2° C./min.

In another aspect of the invention, the method is particularly useful for use with a reaction extrusion system, especially for a heat sensitive polymer made by the system. For example, the monomers and/or prepolymers are polymerized in the reaction extruder and the polymer melt is continuously extruded. The extruded melt is molded directly instead of being made into pellets which pellets must be fed into a molding machine such as an injection molding machine and reheated to mold the article. The continuous E-C molding process of the invention is energy efficient and produces an article having enhanced optical properties.

In another aspect of the invention, the method uses a pelletized polymeric material such as polystyrene, PMMA, polycarbonate, SAN, etc. The polymer is melted and the melt extruded for a subsequent compression molding process according to the invention as described hereinabove. The same steps above of eliminating any stress and birefringence and preventing deformation in the molding process can also be achieved with pelletized materials in the molding process of the invention.

In an additional aspect of the invention, a preferred apparatus for making optical articles is provided comprising:

a rotatable turntable for supporting a plurality of lower dies and upper dies, the lower and upper dies forming a die set;

heating means for heating the dies and/or the turntable;

a plurality of support means associated with the turntable, preferably in the form of movable supports in openings in the turntable, to support each of the die sets;

a plurality of compression means associated with each of the support means of the turntable for compressing a melt containing die set to form an optical article;

ejection means for removing the optical article containing die set from the rotating turntable;

melting means for forming a melt of an optical polymeric material;

lower die supply means for supplying a lower die to a support means to receive a portion of the melt;

melt supply means for feeding the melt to the upper surface of the lower die; and upper die supply means for supplying an upper die to the top of the melt containing lower die forming a melt containing die set comprising, in sequence, a lower die, polymer melt and upper die;

wherein the melt containing die set is compressed using the compression means to form the optical article, the die set is rotated on the turntable for a desired time and the compression means deactivated and the die set is then ejected from the turntable using the ejection means, the formed optical article is separated from the upper die and lower die and the lower die and upper die recycled to their respective supply means.

It will be understood by those skilled in the art that other conveying means may be used instead of a turntable (including both horizontal, angled and vertically disposed turntables), such as a conveyor, shuttle, etc., with the same apparatus means and method steps being employed as noted hereinabove to form optical articles. It is also contemplated herein that the lower die and upper die can both be integral to the apparatus wherein the lower die is part of the support means and the upper die is the compression head of the pressing means. In this configuration, a lower die feeder and upper die feeder will not be employed and upon ejection, only the formed lens will be ejected from the apparatus. Accordingly, any post treatment procedure will preferably take place in the apparatus while the apparatus is moving from start to finish (polymer feed to lens ejection).

The economic advantages of the present continuous E-C process for lenses are increased because the shape of the article made in this process is relatively simple and has geometrical symmetry. Inexpensive dies such as glass dies may be utilized and are preferred to comprise the lower die and upper die forming the die set. This is important because a plurality of die sets are used in sequence in the process instead of only one mold as in a typical intermittent process such as in an injection molding or an injection-compression molding process. Glass dies are suitable for use in the subject process since the process uses relatively high temperatures and a relatively low molding pressure. The capability of using glass dies is an important feature of the invention since the glass die surface can be more easily processed into optical grade smoothness than a metal die surface. The dies can also be made of metal. For example, metal dies can be inexpensively made by an electroforming process and even though more expensive than glass dies, have a much larger operating life.

Any suitable press may be used in the process and the production rate of the process is high because of the sequential multiple die set operation.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–5 of the drawings in which like numerals refer to like features of the invention. Features of the invention are not necessarily shown to scale in the drawings.

The extruders used in this invention can be any type such as a twin screw intermeshing, non-intermeshing or combination of twin screw and a single screw extruder or a single screw extruder. An extruder may be defined as an apparatus wherein a polymer is heated and plasticized and a portion of the melt used to fill a mold, typically by forcing the melt through an opening of the apparatus. The ratio of length/diameter (L/D) of the extruder can be up to 140 or more depending upon the material to be processed. In a reaction extrusion system, a twin screw extruder is preferred and an L/D ratio of 32 to 140 is preferred with a ratio of 36 to 100 being more preferred depending upon different reaction systems. For plasticizing polymeric materials, both a twin screw and a single screw extruder can be used and an L/D ratio of 16 to 80 is preferred and 20 to 56 is more preferred. A heater may also be used to form a melt and the melt fed to the mold by conventional means in the same manner as from an extruder.

The extruder is preferred to have one to five feeding ports and one to five venting ports. The temperature and screw speed of the extruder are set at the normal operation range of the parameters for the material extrusion process in order to produce a melt with a viscosity generally in the range of 1,000 to 300,000 cps or more depending upon the material.

A screen changer is typically installed on the extruder for filtering the melt. The melt is extruded to minimize air bubbles, voids or visible inclusions in the extruded melt.

Figure 1:
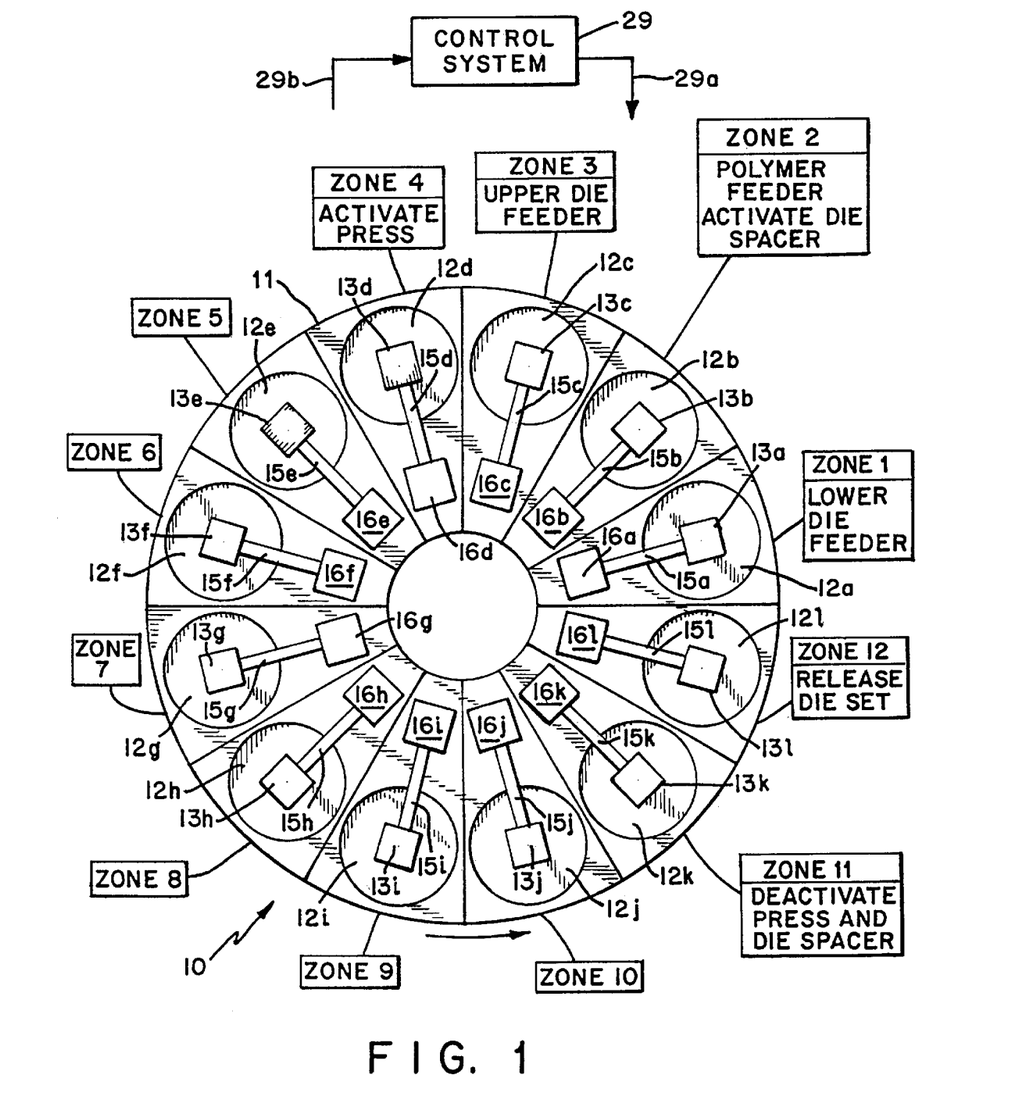
FIG. 1 is a schematic top plan view of an apparatus of the invention used to make optical lenses, the apparatus having 12 zones including 12 openings for die supports so that 12 optical lenses can be formed during one revolution of the turntable at constant rotation operation.

A continuous extrusion-compression molding process of the invention is shown in FIG. 1 generally as 10. The process uses a rotating turntable 11 which is shown divided into a number of zones. In this particular turntable and process there are 12 zones. Each zone is an equally configured segment of the rotating turntable and each zone is shown as having a similar apparatus configuration. Thus, in zone 1, there is shown an opening 12a which will accommodate a lower die, a polymer melt fed on top of the lower die and an upper die placed on top of the melt. A piston and die support member (not shown) is positioned in opening 12a as will be described below. A press apparatus is shown as comprising a press head 13a connected to a vertical member 16a by a cross member 15a. A control system 29 has input lines 29b from the various zones of the apparatus and sends output signals through output lines 29a to the zones of the apparatus. Each zone performs a different function but it will be appreciated that at steady state continuous operation, optical articles are being processed and formed continuously in each zone depending on the zone.

Operation of the apparatus may be described by reference to FIG. 1. At the point of operation of the process as shown in FIG. 1, in zone 1, a lower die feeder feeds a lower die into opening 12a onto a die support (not shown). The press head 13a is in an upward retracted position from opening 12a allowing feeding of the die into the opening. As the turntable 11 rotates counterclockwise in the direction of the arrow, opening 12a moves to zone 2 where a polymer is fed on top of the lower die and a die spacer is activated to hold the lower die in position in opening 12a and to provide a gap between the lower die and upper die which gap defines the thickness of the optical article to be formed. Opening 12l which is now empty and ready for receiving a lower die would then rotate to Zone 1 and a lower die fed into opening 13l. The opening 12a then rotates to zone 3 where an upper die feeder feeds an upper die onto the top of the polymer melt. As the turntable 11 continues to rotate, opening 12a now containing a lower die, a polymer melt on top of the lower die, and an upper die on top of the melt (forming a melt containing die set) is moved (rotated) to zone 4 where the press is actuated and press head 13a exerts pressure on the die set in the opening 12a. The pressure of the press is maintained through zones 5–10 as the turntable 11 rotates. At zone 11, the press is deactivated and pressure head 13a is moved upward freeing the die set. The die spacer is also deactivated to free the die set. When the opening 12a rotates to zone 12, the die set is released and removed (ejected) from the rotating turntable 11. The apparatus is maintained at an elevated temperature by conventional heating devices such as electrical heating cartridges and the die set during the rotation cycle is at an elevated temperature and will be transferred to a post-treatment area for cooling of the die set, removing of the lower die and upper die from the die set and removal of the formed optical article from the die set. The lower die and upper die are then recycled to the lower die feeder positioned at zone 1, and the upper die feeder positioned at zone 3, respectively.

It will be appreciated that at steady state continuous operation when the turntable 11 is rotating, that each of the openings 12a–12l will rotate through each of the zones and will have the corresponding operations performed thereon in the particular zone as indicated above for one of the openings 12a. Thus, at steady state as shown in FIG. 1, the opening 12a in zone 1 will be empty and a lower die will be fed into the opening. In zone 2 the opening 12b will have a lower die in the opening which will be fed with a polymer and the die spacer activated to provide a space between the lower die in the opening and the upper die which will be fed into the opening later. In zone 3 a lower die which is held in place by the die spacer will have a polymer melt on top of the lower die and an upper die will be fed onto the top of the polymer melt. In zone 4 a die set will be formed (compressed) when the press is actuated. In zones 5–10, the compressed die set will be continued to be compressed providing the necessary dwell (cure) time for the optical article to be formed. In zone 11, the press is deactivated and the die spacer deactivated to free the die set. In zone 12 the die set is released and ejected from the turntable apparatus.

As will be more fully discussed hereinbelow, it will be appreciated that the lower dies, polymer melt and upper dies are all preferably at an elevated temperature to facilitate the molding process. The continuous extrusion-compression system is maintained at an elevated temperature during the process so that when the die set is eventually released in zone 12, the die set is still preferably at an elevated temperature above the glass transition temperature (Tg). The released die set at an elevated temperature is then transferred to a post-treatment area to complete formation of the optical article and recycle of the lower die and upper die to the lower die feeder and upper die feeder respectively.

Figure 2:
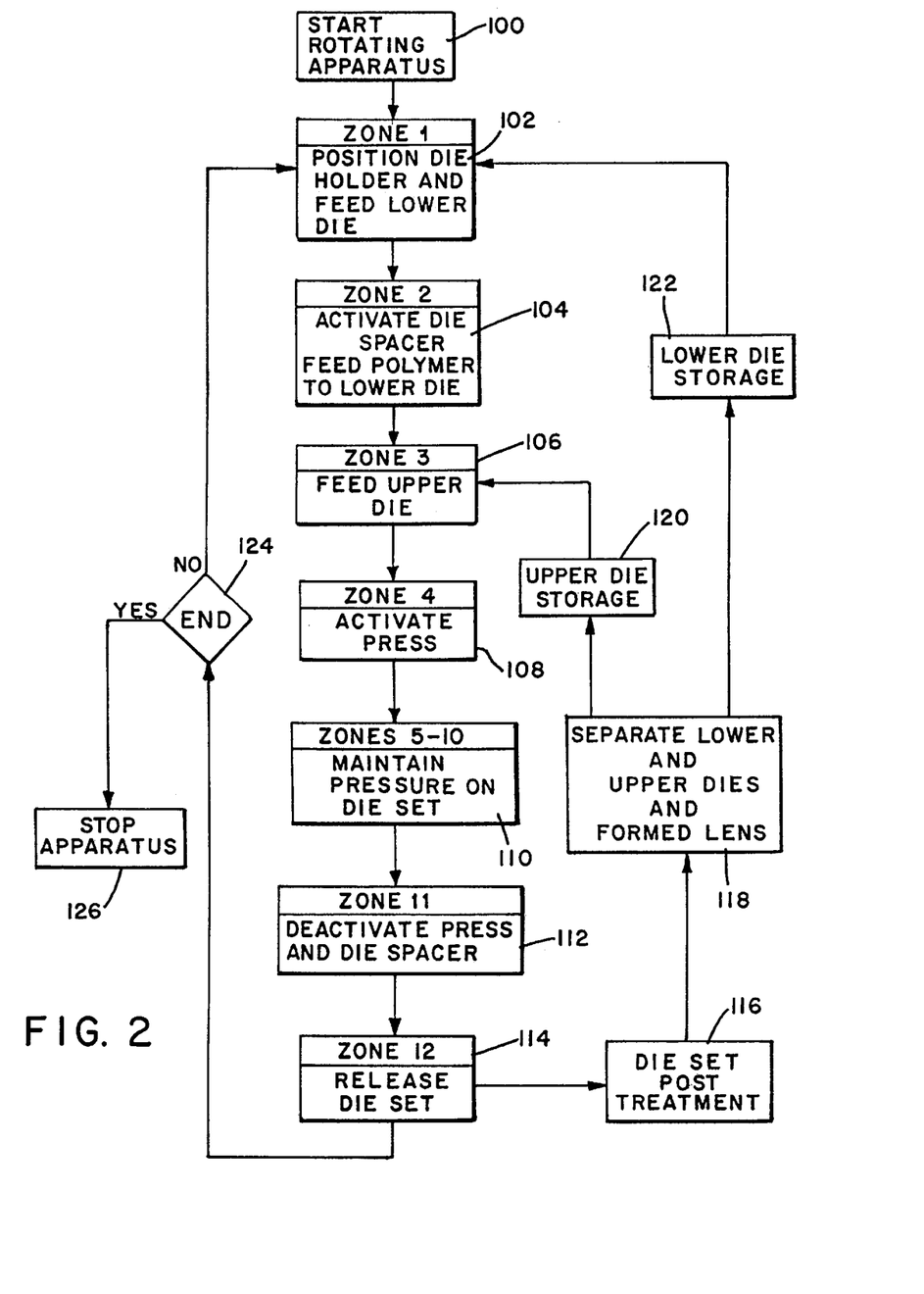
FIG. 2 is a flow sheet of a method of the invention used to make optical lenses using the apparatus of FIG. 1.

Referring now to FIG. 2, a flow chart of a typical continuous extrusion-compression molding process is shown. The flow chart is applicable to a rotational system as shown in FIG. 1 or to a linear conveyor type system as will be appreciated by those skilled in the art. In step 100, the apparatus is started rotating. In zone 1, the die holder is positioned and a lower die fed to the die holder in step 102. As the apparatus rotates to zone 2 the die spacer is activated and a polymer fed to the lower die in step 104. In step 106, the lower die with a polymer melt on the surface of the die is moved to zone 3, and an upper die fed on top of the molten polymer. This melt containing die set then moves to zone 4 in step 108 and the press is actuated to compress the die set. The compressed die set from zone 4 then moves through zones 5–10 in step 110 where the pressure is maintained on the die set. When the compressed melt containing die set reaches zone 11 in step 112, the press is deactivated and the die spacer is also deactivated freeing the compressed die set. The freed up die set then moves to zone 12 where the die set is released from the apparatus. The released die set is transferred to the die set post-treatment step 116. After post-treatment in step 116, the lower and upper dies are separated from the formed lens in step 118. The upper dies are moved in step 120 to upper die storage step 120 from which they will be transferred to zone 3 in step 106. The lower dies are moved from step 118 to lower die storage step 122 and will be moved from that storage to zone 1 in step 102 when needed. After release of the die set in zone 12 and step 114, the system checks to determine in step 124 if the process is to continue. If the process is to continue, the apparatus continues rotating and a new lower die fed into zone 1 in step 102. If it is desired to end the process, the process is ended by step 126. It will be appreciated that the flow chart shown in FIG. 2 is for one particular lens to be formed as it is moved through zones 1–12. Thus, at steady state continuous operation, when a particular die set is being released from zone 12, zone 1 is empty and ready for the reception of a lower die. In this position of the turntable there is also a lower die which is being fed a polymer melt shot in zone 2 in step 104. Thus, each of the zones will be performing the desired operation with a lower die being fed continually as needed to the apparatus and a die set being removed from the apparatus in zone 12.

Referring now to FIGS. 3A–3F the various operations performed during the process may be demonstrated.

Figure 3A:
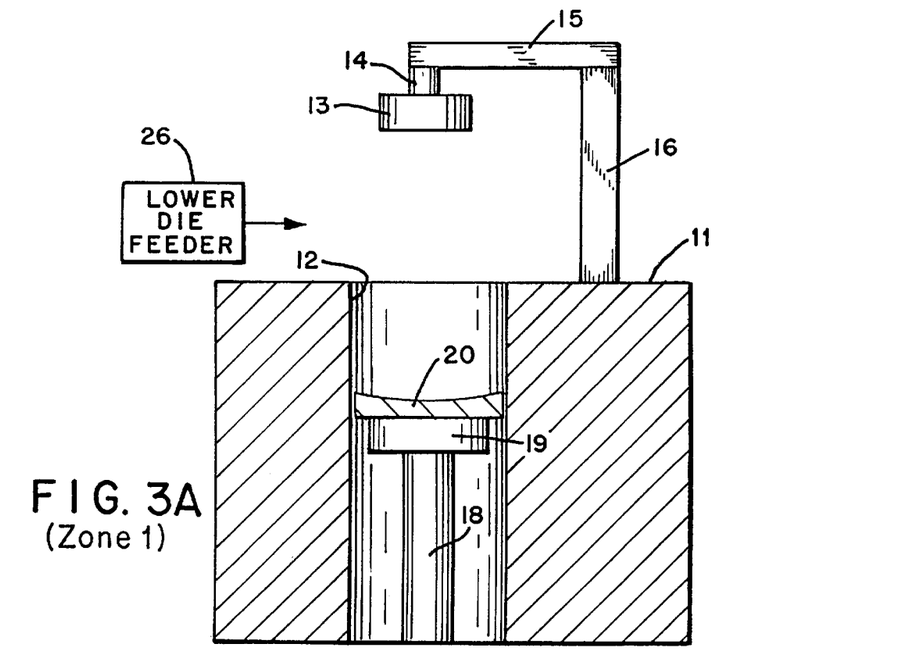
FIG. 3A is a schematic side elevational view of Zone 1 of FIG. 1 wherein a lower die is fed into the turntable apparatus.

In FIG. 3A which shows the rotating apparatus in zone 1, a die piston 18 having a piston platform (die support) 19 is shown in position receiving a lower die from lower die feeder 26. The lower die 20 is received in opening 12 of the rotating apparatus and rests on the upper surface of die support 19. The size of opening 12 is slightly larger (e.g., ⅛ inch to ¼ inch or more) than the size of lower die 20 to accommodate the die and movement of the die to allow the die to move into and downward in the opening and rest on the surface of platform 19 in its upright position for receiving a polymer melt. A press head 13 is shown positioned over opening 12 and is attached to a press piston 14 which is attached to an arm 15 connected to a press vertical structural support member 16. The press head 13 is shown positioned above the upper surface of turntable 11 so that the lower die feeder 26 can feed the die 20 into opening 12.

Figure 3B:
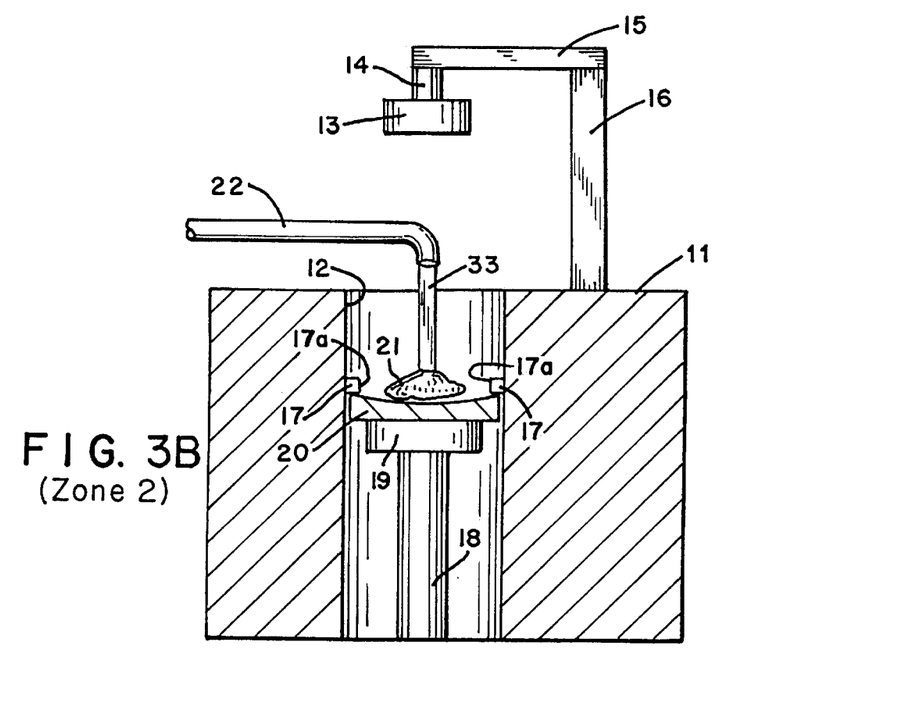
FIG. 3B is a schematic side elevational view of Zone 2 of FIG. 1 wherein a polymer melt is fed onto the lower die surface and a die spacer used to secure the die.

In zone 2 shown in FIG. 3B a polymer melt 21 is shown on the upper surface of lower die 20. A die spacer 17 is activated and extends into opening 12 to hold lower die 20 securely in position on die piston platform 19 and provide a space or gap 17a which is the desired lens thickness. Polymer feeder 22 is shown extending over opening 12 and would distribute the polymer melt 21 to the rotating turntable 11 when opening 12 is in zone 2. Press head 13 is shown still in the unactivated position above the upper surface of rotating turntable 11 which facilitates adding the polymer melt 21 to the die 20.

It is contemplated that the polymer melt will preferably flow continuously as a strand 33 from the polymer feeder 22. Excess polymer distributed between adjacent dies will be broken by the edge of the upper die and be pushed out and removed by, for example, a rod operated by an air cylinder located under the piece of the excess polymer material.

Figure 3C:
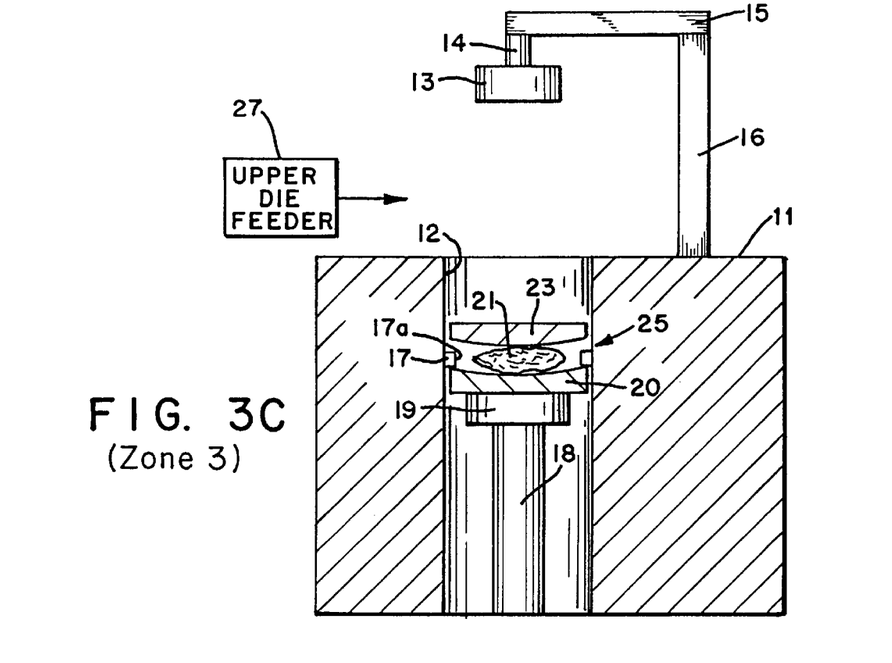
FIG. 3C is a schematic side elevational view of Zone 3 of FIG. 1 wherein an upper die is positioned on top of the melt forming a die set.

In FIG. 3C, the rotating turntable is at zone 3 and an upper die feeder 27 has fed an upper die 23 on the top of polymer melt 21 and the lower die 20 forming a melt containing die set 25.

Figure 3D:
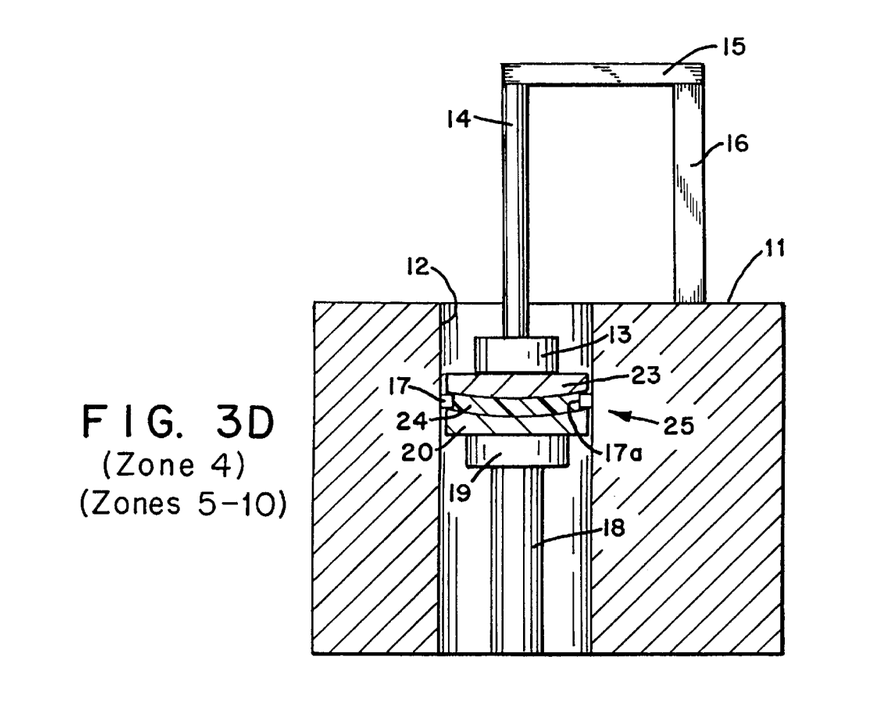
FIG. 3D is a schematic side elevational view of Zones 4 and 5–10 of FIG. 1 wherein the die set is compressed during rotation of the turntable through Zones 4–10.

In zone 4, as shown in FIG. 3D, the press head 13 is activated and press piston 14 moves downward to force press head 13 against the upper surface of upper die 23 and die set 25. This compresses the polymer melt 21 now shown as optical article 24. The pressure on the die set 25 is maintained through zones 5–10 also shown in FIG. 3D. Note that the die spacer 17 inhibits the downward movement of upper die 23 so that the proper space (height) 17a is formed. The space 17a determines the size of the lens and can be controlled depending on the lens desired.

Figure 3E:
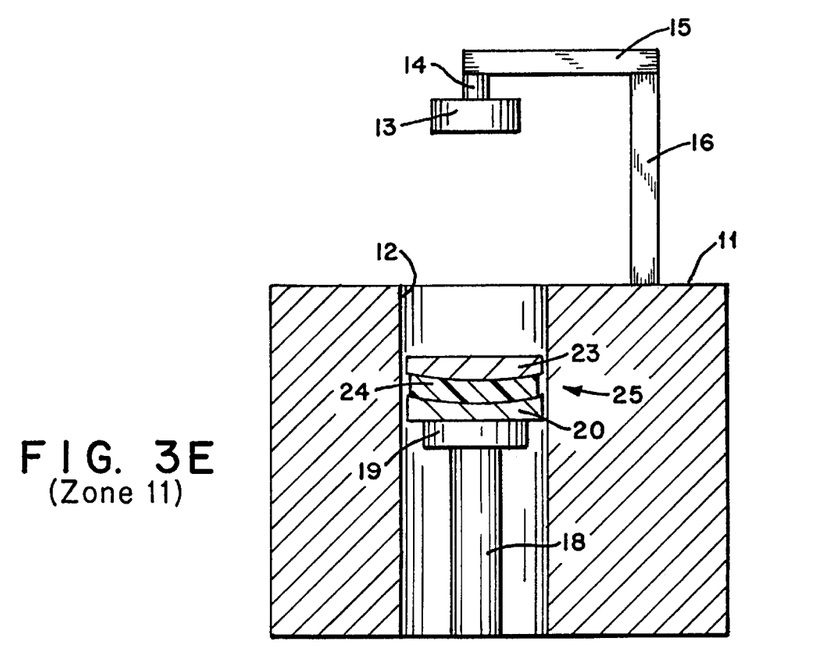
FIG. 3E is a schematic side elevational view of press and spacer deactivation one 11 of FIG. 1.
Figure 3F:
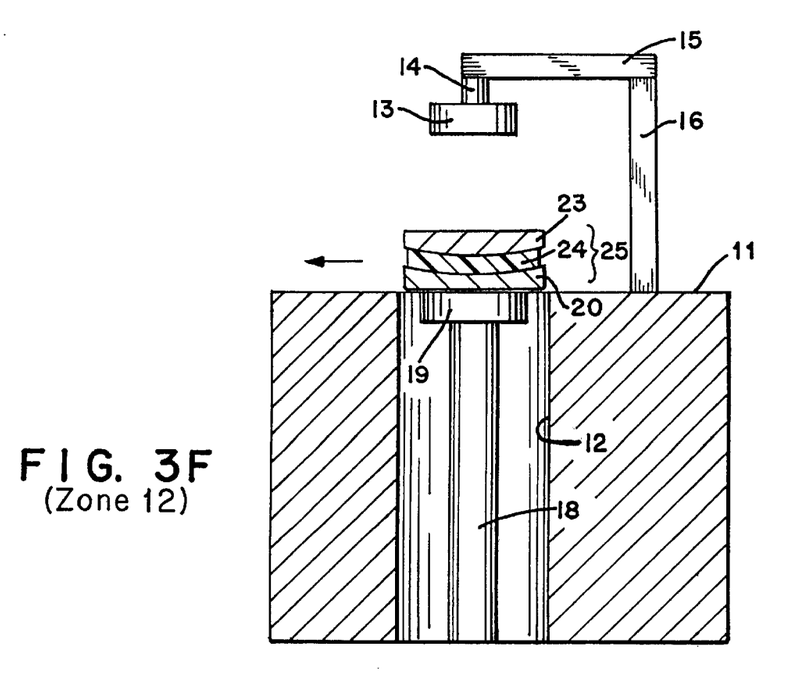
FIG. 3F is a schematic side elevational view of release die set Zone 12 of FIG. 1.

When the rotating wheel 11 reaches zone 11 as shown in FIG. 3E, the die spacer 17 is retracted into the body of the rotating wheel and the press head 13 deactivated (retracted upward). This frees the die set 25 for removal of the die set from the rotating turntable apparatus as shown in FIG. 3F. Thus, in FIG. 3F, the die piston 18 is actuated upward moving the die piston platform 19 to the upper surface of rotating turntable 11 where the optical article containing die set 25 can be removed (ejected) as shown by the arrow from the rotating turntable. After removal of the die set 25, the opening 12 is now empty of a die and the opening 12 would then be moved (rotated) to zone 1 where the die piston 18 is lowered for the reception of another lower die 20 as shown in FIG. 3A. The above process is continued as the turntable 11 rotates through the various zones with a different operation being performed in each zone during steady state continuous operation as discussed hereinabove.

Figure 4:
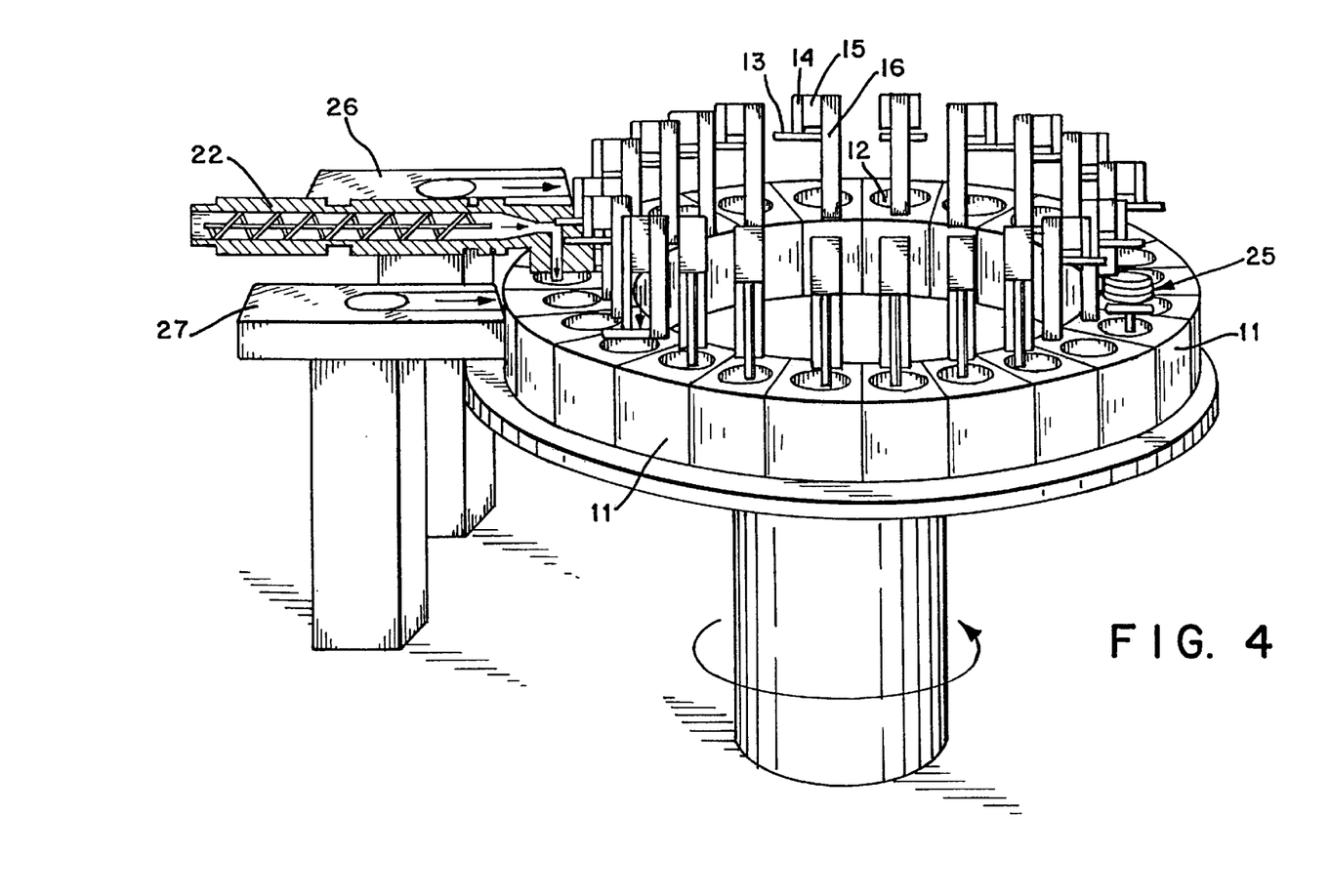
FIG. 4 is a schematic perspective view of a horizontal rotating apparatus of the invention.

FIG. 4 shows a perspective view of a similar rotating turntable apparatus of the invention as shown in FIG. 1. The apparatus of FIG. 4 has more than 12 zones however, and is shown having 24 zones. As the apparatus 11 rotates, a lower die feeder 26 will feed lower dies into a positioned opening 12. Extruder 22 is shown forming a polymer melt and feeding the melt into an opening 12 which would contain a lower die. An upper die feeder 27 is shown feeding an upper die to an opening 12 which would have therein a lower die and a polymer shot on top of the die. Depending on the position of the turntable, press head 13 which is connected to press piston 14 and structural members 15 and 16 and will either be in the unactivated upward position or in an activated downward position compressing the dies. A die set 25 containing a formed optical article is shown ready for ejection from the system. Typically the ejection zone would be closer to the feeding zone at lower die feeder 26 but is shown therein for clarity.

Figure 5:
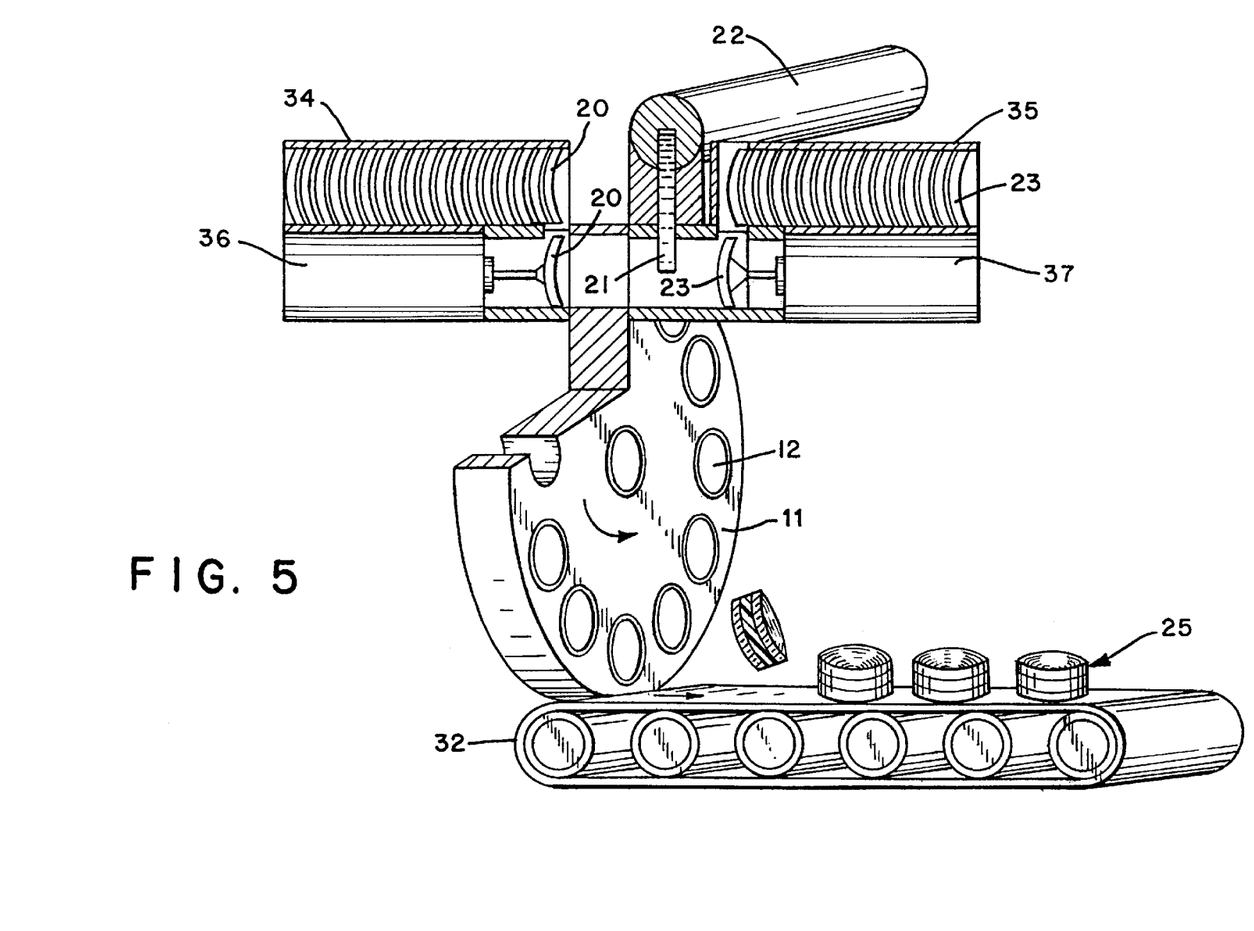
FIG. 5 is a schematic perspective view of a vertical rotating apparatus of the invention.

FIG. 5 shows a vertical rotating turntable 11 wherein an extruder 22 provides a molten polymer feed 21. Lower dies 20 and upper dies 23 are shown being fed from lower die supply 34 and upper die supply 35 into the vertical rotating assembly by pistons 36 and 37 respectively. Referring to FIGS. 1 and 4, each opening 12 would have associated therewith its own pistons 36 and 37, which pistons would also be used to compress the melt containing die set. When the die set is ejected onto conveyor 32, piston 37 would be retracted and piston 36 activated to push the die set onto the conveyor. Other pistons 36 and 37 for the openings 12 are not shown for clarity. The ejected die sets 35 are moved on a conveyor 32 to post treatment.

Regardless of the molding configuration employed, the polymer containing die set 25 is preferably maintained at a temperature about 20° C. below Tg to 80° C. higher than the Tg of the material during post-treatment. The die set is preferably kept closed during post-treatment. A number of different post-treatments can be path is helpful for improving the quality of the molded article and it is a preferred feature of the invention that the cross section of the melt strand be circular and the diameter of the circle be as large as possible with the proviso that the quantity of the melt added to the die be only slightly more than the quantity needed for making the article. The excess amount of the melt is about 1 to 10% weight of the article but may be larger depending on the polymer used, etc. Another option is to deposit an exact amount of the melt and each unit has no escape gate for the melt. When the die set containing melt is pressed, only air is vented out and all of the material is kept inside of the die set.

A nitrogen atmosphere blanket or other inert gas may be used in the process, if necessary, to protect the polymer from oxygen and moisture.

Control system 29 obtains input/output data from each zone (zones 1–12) and uses the data to control the process. For example, data from zone 1 is typically that the lower die 12 is properly positioned on the die support 19, and the temperature of the support 19 and lower die 20.

Various embodiments of the present invention will now be illustrated by reference to the following specific examples. It is to be understood, however, that such examples are presented for purposes of illustration only, and the present inventions in no way to be deemed as limited thereby.

EXAMPLE

Example of Polycarbonate Lens Molding Using Continuous Extrusion Compression Molding Method A lens article was made using a horizontal rotating turntable apparatus similar to that shown in FIG. 1. The extruder is a single screw extruder made by Merritt David Corp., L/D=24, 1.5" diameter screw, three barrel heating zones and one clamp heating zone and two sections of discharge die heating zones. Temperature settings for the zones are as follows: employed depending on the properties of the polymer and/or the requirements of the article. For example, the polymer containing die set 25 may be kept closed and the temperature of the dies maintained by heating the die set to allow annealing of the formed article therein to complete the polymerization or to eliminate any stress and birefringence without deforming the shape of the article. The polymer containing die set may also be allowed to gradually cool and then opened to release the formed article. The optical article (lens) is removed from the die set and the lower die and upper die transferred to their respective die feeders.

In an important feature of the invention, the polymer feeder (extruder) is controlled to feed a melt strand continuously to a plurality of lower dies advancing through the process in sequence without interruption. The melt extrudate is cut or broken by the edge of the upper die and the die spacer. The melt is preferably collected on the lower die surface so that the contact area of the melt and die is as small as possible at the beginning of the feeding and gradually the area of the melt is increased over the die area with no appreciable voids or bubbles being trapped in the contact area. To achieve such a flow pattern, the contour of the extrudate nozzle and the shape of the extruder die opening preferably forms a vertically falling melt strand having a circular cross section with a round tipped bottom side formed by gravity acting on the melt strand. The temperature and cross-section of the melt strand are specially controlled to form such a melt strand shape. The tipped bottom of the melt will contact the surface of the lower die first. When the melt strand is settling to cover the lower die surface, the contact area between the melt strand and the surface of the die increases by spreading outwards along the die surface and no voids or air bubbles are trapped inside of the contact area. The distance the extrudate (melt strand) moves before contacting the die surface is generally about 2 to 6 inches, preferably 3–5 inches. The upper die is added (placed) on top of the melt shot and when the pressing force is urged onto the upper die, the contact area between the melt and the die surface continuously increases by spreading outwards toward the lower die and upper die edges. Bubbles and voids are avoided using this technique. Increasing the compression

| Zone | 1 (barrel) | 2 (barrel) | 3 (barrel) | 4 (clamp) | 5 (die) | 6 (die) |
|---|---|---|---|---|---|---|
| T(° C.) | 265 | 292 | 282 | 280 | 275 | 275 |

The polycarbonate (PC) material used in the process was Macronlon 2658 sold by Bayer. The extruder discharge die opening is a 7/8" diameter circular shape. The PC melt strand extruded from the extruder has a smooth surface. The melt strand was deposited on the lower dies continuously and the upper dies were placed on the top of the melt. The upper and lower dies were all heated at 230° C. before contact with the melt. The die sets were pressed with a press head driven by an air cylinder with 45 psi pressure for 1.5 minutes. The die sets with the lenses were then ejected and kept in a heated oven at 145° C. for 20 minutes before coming to room temperature. The released polycarbonate lenses have excellent optical quality and have little birefringence when checked under a pair of polarizer films.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of forming an optical article comprising:
   supplying a rotating turntable having a plurality of spaced die supports for a lower die and an upper die forming an optical article forming die set;
   rotating the turntable;
   forming a melt of an optical polymeric material in a melting apparatus and feeding the melt from the apparatus in the form of an unpressurized melt strand;
   supplying a lower die from a lower die supply device onto one of the die supports;
   forming and adding a predetermined melt shot portion of the unpressurized melt to the upper surface of the lower die;
   supplying an upper die from an upper die supply device and positioning the upper die on top of the unpressurized melt forming a melt containing die set comprising, in sequence, a lower die, polymeric material and an upper die;
   compressing the melt containing die set using a press associated with the die support forming an optical article;
   releasing the press when the optical article is formed;
   removing the die set from the rotating turntable;
   removing the optical article from the die set;
   recycling the lower die and upper die of the die set to their respective supply devices; and
   repeating the above steps until the desired number of optical articles are made.

2. The method of claim 1 wherein the melt is formed in an extruder.

3. The method of claim 1 wherein the dies and rotating turntable are heated.

4. The method of claim 1 wherein the dies are heated to a temperature higher than the Tg of the polymer and less than the decomposition temperature of the polymer.

5. The method of claim 4 wherein the temperature of the dies is between 20° C. higher than the Tg to 10° C. lower than the decomposition temperature of the polymer.

6. The method of claim 5 wherein the die set after removal from the turntable is post-treated by cooling the die set from an initial temperature about 20° C. above Tg to 15° C. below Tg at a rate of 0.1 to 5° C./minute.

7. The method of claim 6 wherein the initial temperature is about 10° C. above Tg.

8. The method of claim 6 wherein the cooling rate is about 2° C./minute.

9. The method of claim 1 wherein the die supports are positioned in openings in the rotating turntable.

10. A method of forming an optical article comprising:
    supplying a conveyor having a plurality of spaced die supports for a lower die and an upper die forming an optical article forming die set;
    moving the conveyor;
    forming a melt of an optical polymeric material in a melting apparatus and feeding the melt from the apparatus in the form of an unpressurized melt strand;
    supplying a lower die from a lower die supply device onto one of the die supports;
    forming and adding a predetermined melt shot portion of the unpressurized melt strand to the upper surface of the lower die;
    supplying an upper die from an upper die supply device and positioning the upper die on top of the unpressurized melt forming a melt containing die set comprising, in sequence, a lower die, polymeric material and an upper die;
    compressing the melt containing die set using a press associated with the die support forming an optical article;
    releasing the press when the optical article is formed;
    removing the die set from the conveyor;
    removing the optical article from the die set;
    recycling the lower die and upper die of the die set to their respective supply devices; and
    repeating the above steps until the desired number of optical articles are made.

11. An apparatus for making optical articles comprising:
    a rotatable turntable for supporting a plurality of lower dies and upper dies, the lower and upper dies forming a die set;
    heating means for heating the dies and/or the turntable;
    a plurality of support means associated with the turntable to support each of the die sets;
    a plurality of compression means associated with each of the support means of the turntable for compressing a melt containing die set to form an optical article;
    ejection means for removing the optical article containing die set from the rotating turntable;
    melting means for forming a melt of an optical polymeric material and feeding the melt from the melting means in the form of an unpressurized melt strand;
    lower die supply means for supplying a lower die to a support means to receive a portion of the melt strand;
    melt supply means for feeding the unpressurized melt strand to the upper surface of the lower die and forming the unpressurized melt strand into a predetermined unpressurized melt shot portion; and
    upper die supply means for supplying an upper die to the top of the unpressurized melt shot containing lower die forming a melt containing die set comprising, in sequence, a lower die, polymer melt and upper die;
    wherein the melt containing die set is compressed using the compression means to form the optical article, the die set is rotated on the turntable for a desired time and the compression means deactivated and the die set is then ejected from the turntable using the ejection means, the formed optical article is separated from the upper die and lower die and the lower die and upper die recycled to their respective supply means.

12. The apparatus of claim 11 wherein the turntable is vertical.

13. The apparatus of claim 11 wherein the turntable is horizontal.

14. The apparatus of claim 11 wherein the melting means is an extruder.

15. The apparatus of claim 11 wherein the dies are glass.

16. The apparatus of claim 11 wherein the dies are metal.

17. The apparatus of claim 11 wherein the apparatus further comprises post-treatment means to cool the die set and form the optical article.

18. The apparatus of claim 17 wherein the post-treatment means cools the die set from an initial temperature about 20° C. above Tg to about 15° C. below Tg at a rate of 0.1 to 5° C./minute.

19. The apparatus of claim 18 wherein the post-treatment means cooling rate is about 2° C./minute.

20. The apparatus of claim 11 wherein the support means are movable within openings in the turntable.

21. An apparatus for making optical articles comprising:
a conveyor for supporting a plurality of lower dies and upper dies, the lower and upper dies forming a die set;
heating means for heating the dies and/or the conveyor;
a plurality of support means associated with the conveyor to support each of the die sets;
a plurality of compression means associated with each of the support means of the conveyor for compressing a melt containing die set to form an optical article;
ejection means for removing the optical article containing die set from the conveyor;
melting means for forming a melt of an optical polymeric material and feeding the melt from the melting means in the form of an unpressurized melt strand;
lower die supply means for supplying a lower die to a support means to receive a portion of the melt strand;
melt supply means for feeding the unpressurized melt strand to the upper surface of the lower die and forming the unpressurized melt strand into a predetermined unpressurized melt shot portion; and
upper die supply means for supplying an upper die to the top of the unpressurized melt shot containing lower die forming a melt containing die set comprising, in sequence, a lower die, polymer melt and upper die;
wherein the melt containing die set is compressed using the compression means to form the optical article, the die set is moved on the conveyor for a desired time and the compression means deactivated and the die set is then ejected from the conveyor using the ejection means, the formed optical article is separated from the upper die and lower die and the lower die and upper die recycled to their respective supply means.

22. The method of claim 1 wherein the melt shot portion added to the lower die is cylindrical in shape.

23. The method of claim 23 wherein the unpressurized melt strand is falling vertically from the melting apparatus and is used to form the unpressurized melt shot.

24. The method of claim 23 wherein the melting apparatus is an extruder.

25. The method of claim 10 wherein the melt shot portion added to the lower die is cylindrical in shape.

26. The method of claim 25 wherein the unpressurized melt strand is falling vertically from the melting apparatus and is used to form the unpressurized melt shot.

27. The method of claim 26 wherein the melting apparatus is an extruder.

28. The apparatus of claim 11 wherein the melt shot portion added to the lower die is cylindrical in shape.

29. The apparatus of claim 289 wherein the unpressurized melt strand is falling vertically from the melting apparatus and is used to form the unpressurized melt shot.

30. The apparatus of claim 29 wherein the melting apparatus is an extruder.

* * * * *

UNITED STATES PATENT AND TRADEMARK OFFICE
CERTIFICATE OF CORRECTION

PATENT NO. : 6,042,754
DATED : March 28, 2000
INVENTOR(S) : Yang, et. al.

It is certified that error appears in the above-identified patent and that said Letters Patent is hereby corrected as shown below:

Column 12, line 10, the words starting with "employed depending on the properties ..." to column 12, line 50 the words "... Increasing the compression" should be inserted at column 11, line 40 after the phrase "different post-treatments can be"..

Column 7, line 28, delete "one" and substitute therefor -- zone --.

Claim 23, line 1, delete "23" and substitute therefor -- 22 --.

Claim 29, line 1, delete "289" and substitute therefor -- 28 --.

Signed and Sealed this

Sixth Day of February, 2001

Attest:

Q. TODD DICKINSON

Attesting Officer    Director of Patents and Trademarks